US007563407B2

(12) United States Patent
Harasym

(10) Patent No.: US 7,563,407 B2
(45) Date of Patent: Jul. 21, 2009

(54) THERMAL LANCE ASSEMBLY

(76) Inventor: Michael F. Harasym, 184 Hunt Valley Cir., Berwyn, PA (US) 19312

( * ) Notice: Subject to any disclaimer, the term of this patent is extended or adjusted under 35 U.S.C. 154(b) by 0 days.

(21) Appl. No.: 11/985,131

(22) Filed: Nov. 14, 2007

(65) Prior Publication Data

US 2008/0061483 A1 Mar. 13, 2008

Related U.S. Application Data

(63) Continuation-in-part of application No. 11/336,006, filed on Jan. 20, 2006, now Pat. No. 7,537,723.

(51) Int. Cl.
*B23K 7/00* (2006.01)

(52) U.S. Cl. ........................................ 266/271; 266/48

(58) Field of Classification Search .................. 266/48, 266/271

See application file for complete search history.

(56) References Cited

U.S. PATENT DOCUMENTS 4,391,209 A 7/1983 Moore ........................ 110/349
4,450,986 A 5/1984 Harasym et al. ............ 222/591
4,746,037 A 5/1988 Harasym .................... 222/591
4,787,142 A 11/1988 Henderson et al. ............ 29/825
4,877,161 A 10/1989 Harasym .................... 222/591
2007/0170625 A1* 7/2007 Harasym .................... 266/225
2008/0061483 A1* 3/2008 Harasym ..................... 266/48

* cited by examiner

*Primary Examiner*—Scott Kastler
(74) *Attorney, Agent, or Firm*—Drinker Biddle & Reath LLP; John J. Marshall

(57) ABSTRACT

An improved thermal lance is made of a low carbon steel sheath having an internal bore and a thin cylindrical rod that is roll-formed from low carbon steel sheet. The rod being sized for conforming fit in the bore of the tube and has a length dimension that is longer than the length of the tube. The rod is inserted into the bore of the tube and allowed to move axially within the tube under propulsion of the pressurized oxygen to allow the rod to be burned at a rate independent of the burn rate of the sheath. One or more apertures in the tube restrict the flow of oxygen until the rod is ignited. An O ring located near the fuse protector of the lance housing keeps the lance from moving during routine handling and storage.

3 Claims, 5 Drawing Sheets

THERMAL LANCE ASSEMBLY

CROSS-REFERENCE TO RELATED APPLICATION

This application is a continuation-in-part application of U.S. patent application Ser. No. 11/336,006, filed Jan. 20, 2006, now U.S. Pat. No. 7,537,723 the specification of which is hereby incorporated by reference in its entirety.

FIELD OF THE INVENTION

This invention is related to the general field and classification of molten metal dispensing, and to the more specific field of apparatus for unplugging a vessel discharge port with a telescoping thermal lance.

BACKGROUND

The use of a telescoping thermal lance to burn through an obstruction in the discharge port of a vessel containing molten metal is described in U.S. Pat. No. 4,450,986 to Harasym and Lanza; U.S. Pat. No. 4,746,037 to Harasym; and U.S. Pat. No. 4,877,161 to Harasym. Reference can be made to those publications, if needed, for background on the configuration and operation of such discharge ports, the causes of their blockage, and the general use of telescoping thermal lances to burn through the obstruction to initiate flow of the molten metal through the discharge port.

In U.S. Pat. No. 4,450,986, the telescoping lance assembly (identified by reference number 41 on its FIG. 1 and by number 61 on its FIG. 2 includes a cylindrical housing that encloses a free-floating hollow metal tube. High pressure oxygen (on the order of 100 psi) is ported through the housing to propel the tube upwardly into the obstruction and to sustain burning as the combustible material is ignited. The tube is partially filled with magnesium wires or low carbon steel wires as the primary combustible material.

In U.S. Pat. No. 4,746,037, the telescoping lance assembly includes essentially the same construction as U.S. Pat. No. 4,450,986, except that the free floating tube has a flared bottom and a combustible collar at the top. The flared bottom is wider than the opening in a bushing located at the top of the housing to keep the tube from falling out of the housing if it is faced downwardly during handling or installation. The tube is filled with magnesium wires or low carbon steel wires intertwined with steel wool to allow oxygen flow and to provide high surface area for combustion. The combustible collar includes a cardboard sheath wrapped around a low temperature blasting fuse and the exposed ends of the wires and steel wool. This construction provides a more reliable ignition, among other things, compared to the configuration of U.S. Pat. No. 4,450,986.

U.S. Pat. No. 4,877,161 discloses an improved lance assembly in both the conventional telescoping mode and in a double telescoping mode to provide greater extension into a deep discharge port without the need for elongating the housing. The lance assembly (identified as 31 in its FIG. 1 and 91 in its FIG. 11) again includes a cylindrical housing with a port to admit high pressure oxygen. Inside the housing is either one or two free floating tubes having a flared bottom. The tube (when single) or the uppermost tube (when dual) contains combustible magnesium or low carbon steel wires as the combustible material. The tube is crimped into the wires at the top and bottom of the tube to prevent the wires from moving forward or backward inside the tube. As in U.S. Pat. No. 4,746,037, the tips of the wire extend out of the top end of the tube and they may be capped with an igniter covered by tape.

An unpatented variation of lance assembly that has come into the prior art since the publication of the three patents described above is shown in FIG. 1. The depicted lance assembly 10 is a double telescoping type. The improvement was in the combustible lance 12. The telescoping tube 14 within the housing 16 is made of stainless steel to provide a lower rate of consumption than the more combustible material of the thermal lance 12 inside of it. The tube may have a flared base or a base flange 15 to keep it centered in the housing, and the housing may include a bushing near the top end to prevent the tube from completely exiting the housing. The combustible material of the lance is a combination of thin cylindrical rod 20 made of low carbon sheet metal that is roll-formed into a cylindrical rod that allows oxygen to flow axially through the rod. Rods of this type, and the process of making them, are described in U.S. Pat. No. 4,787,142. They are used as electrodes in exothermal cutting of metal and are commonly called burning bars or slice rods. They can be obtained from welding supply distributors under the brand name ARCAIR. The axial oxygen flow and increased surface area as compared to a solid bar or a hollow tubular bar provide for a rapid ignition and for burning in the presence of high temperature and oxygen flow.

The rod 20 is surrounded by a low carbon steel sheath 22 to provide greater rigidity and more mass of combustible low carbon steel. The sheath 22 is formed to have an inner bore slightly greater than the outer diameter of the rod 20 and an outer diameter less than that of the stainless steel tube 14. A section of slice rod is cut to a length that is less than that of the housing 16 to form the inner rod 20. A section of sheath material is cut to a length that is shorter than that of the rod. In this manner, the rod 20 can be inserted into the sheath 22 to extend about ¾ inch to 1½ inch beyond one end 24 of the sheath and several inches out of the other end 26. One end of the sheath 26 is welded to the rod 20 where the longer end of the rod extends such that the rod 20 and sheath 22 move together as a combustible lance 12 within the telescoping tube. The top end of the tube 14 can be crimped into a shape like a bullet and filled with a steel wool (not shown) and can include a low temperature blasting fuse 32.

This later design of lance 12 provided greater combustible mass and more rigidity than the prior lances filled with steel or magnesium wires. Oxygen flow through the inner rod 20 and between the low carbon sheath 22 and the tube 14 provided burning over a large surface area near the tip of the lance 12. The sheath 22 provided substantial rigidity to keep the combustible lance pushed into the obstruction in the discharge port without bending and provided a substantial amount of combustible material.

SUMMARY OF THE INVENTION

The present improvement provides a roll-formed rod and low carbon sheath combination lance with enhanced burn characteristics. The fixed attachment of the rod 20 to the sheath 22 in the prior art lance requires that they advance together and be consumed at the same rate. The present improvement allows the roll-formed rod to advance within the sheath and thus be consumed more rapidly than the sheath with the advantage of providing a more reliable burn. A main cause of an unsuccessful attempt to unplug an obstruction with a thermal lance is that too much of the telescoping tube can be consumed, thereby disrupting the directed oxygen path before the combustible lance burns through the obstruction to initiate metal flow. Thus, increasing the burn rate at the tip of the lance promotes a deeper burn in the same time interval and lessens the risk of oxygen disruption. Also, the rod and sheath will be consumed simultaneously, but at different rates. For example, a rod whose starting length was ½ inch longer than the sheath was then measured at 2 inches shorter than the sheath following penetration of a test sample. To penetrate the test sample, 15 inches of rod were consumed as compared to 12.5 inches of sheath that were consumed. Also, even if the rod is completely consumed, the sheath will continue to burn and penetrate. This results in an estimated 25% to 30% improvement in performance.

The invention also provides a telescoping thermal lance apparatus for unplugging the discharge port of a molten metal containing vessel. The apparatus includes an elongated tubular housing having a hollow interior chamber and a conduit for introducing pressurized oxygen into the housing. The apparatus includes an improved axially displaceable thermal lance disposed within the housing and adapted to be projected upwardly when pressurized oxygen is introduced into the housing. The improved lance includes a low carbon steel sheath having an internal bore into which is disposed a thin cylindrical rod that is roll-formed from low carbon steel sheet. The rod is sized for conforming fit in the bore of the sheath and is longer than the length of the sheath. The rod is inserted into the bore of the sheath and allowed to move axially within the sheath under propulsion of the pressurized oxygen to allow the rod to burn at a rate that is independent of the burn rate of the sheath.

The preferred assembly uses a telescoping stainless steel tube into which the lance is disposed. The lance could, however, be used as the sole telescoping element. In either configuration, a magnet may be disposed at the bottom end of the lance housing to hold the lance, or the lance and telescoping tube, from moving within the housing until pressurized oxygen is introduced into the housing. The magnet may be a disk placed in the bottom of the housing, or a magnetized section of the housing.

DETAILED DESCRIPTION OF THE DRAWINGS

Figure 4:
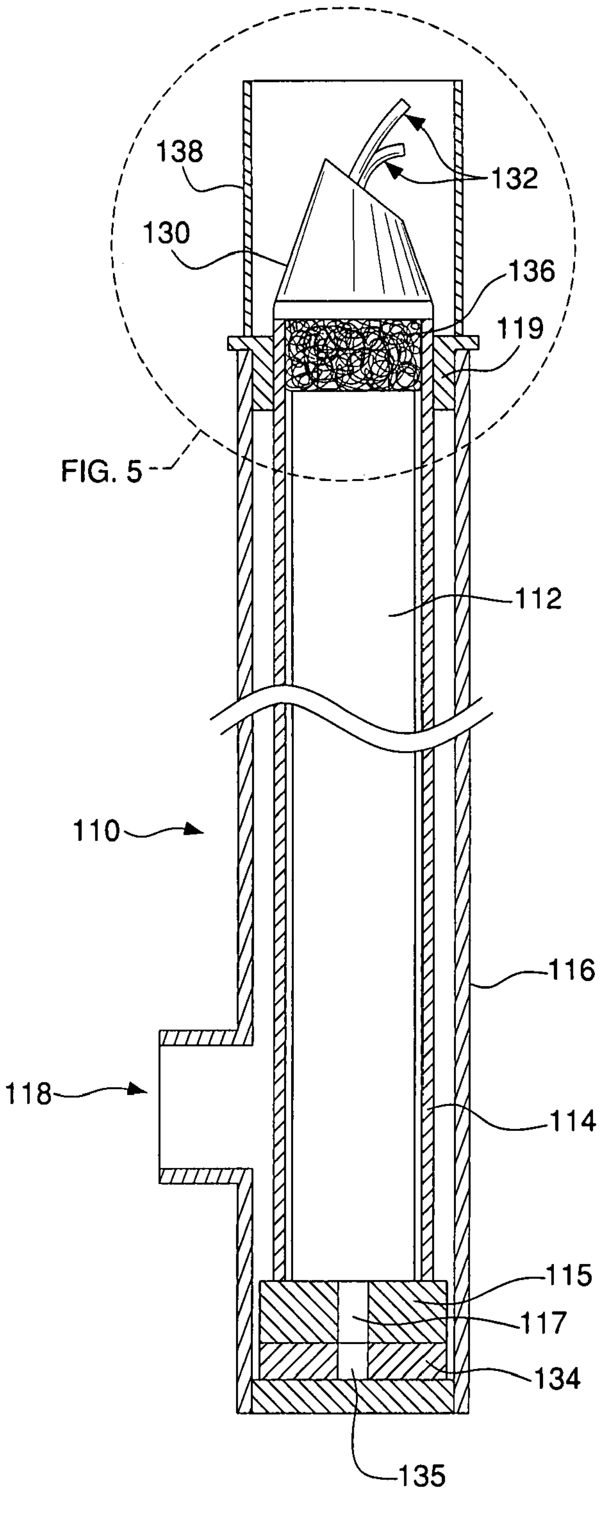
FIG. 4 is a section view of a thermal lance assembly according to the invention.
Figure 5:
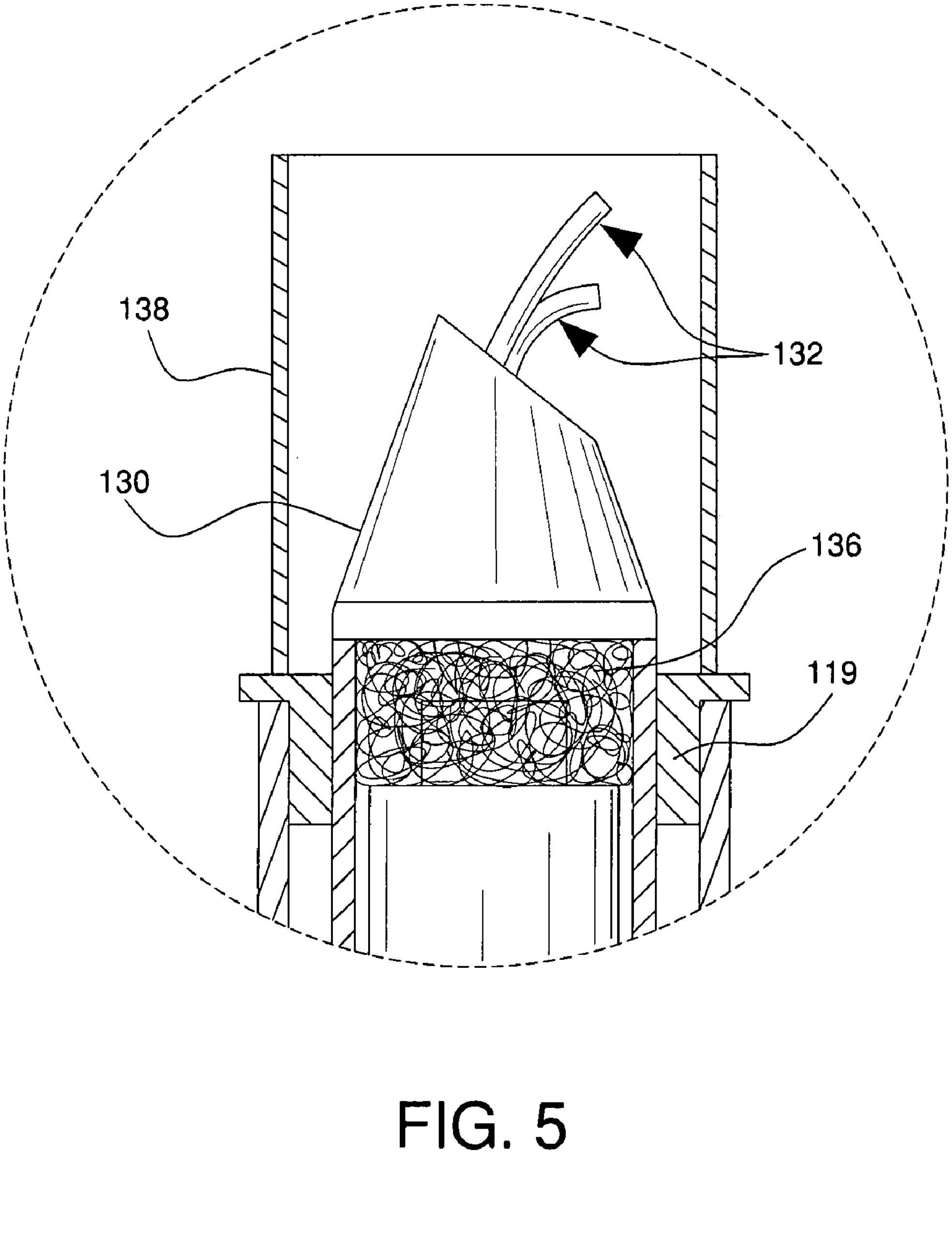
FIG. 5 is a close up section view of the top portion of the thermal lance assembly of FIG. 4.

The invention is an improved thermal lance and lance apparatus for unplugging a vessel discharge port, for example, in a refractory lined ladle, tundish, or furnace used in the casting or melting of molten steel. As shown in FIG. 4, a lance apparatus 110 includes a tubular lance housing 116 having an axially displaceable tube 114 disposed within the interior of the housing. The tube 114 is preferably made of stainless or other high carbon steel. The tube 114 may have a flared base or a base flange 115 to keep it centered in the housing, and the housing includes a bushing 119 near the top end to prevent the tube from completely exiting the housing. The bottom of the tube 116 has an aperture 117 to allow oxygen to flow into the tube.

Disposed within the tube 114 is a thermal lance 112. A conduit 118 communicates pressurized oxygen to the interior of the tube housing 116. When the apparatus is placed in line with an obstructed discharge port and an oxygen supply is opened, the oxygen flow through the conduit 118 and into the housing 116 raises the axially displaceable tube 114 toward the obstruction in the discharge port. Oxygen flows around and through the raised tube to promote rapid burning in the vicinity of the obstruction, as is well known in the field.

The lance apparatus 110 is a double telescoping type, wherein the tube 114 telescopes out of the housing 116, and the lance 112 within the tube 114 also telescopes out of the tube. The telescoping tube 114 is preferably made of stainless steel or other high carbon steel to provide a lower rate of consumption than the more combustible material of the thermal lance 112 inside of it. The base flange 115 will contact the bushing 119 at the uppermost end of the housing to prevent the tube from exiting the housing.

The combustible lance 112 is a combination of a thin cylindrical rod 120 and low carbon steel sheath 122. The rod 120 is made of low carbon steel sheet that is rolled formed into a cylindrical rod that has substantial mass and surface area, yet allows oxygen to flow axially through the rod between the rolls. Rods of this type and the process of making them are described in U.S. Pat. No. 4,787,142, and are used as electrodes in exothermal cutting. The axial oxygen flow and increased surface area provide rapid ignition and burning in the presence of high temperature molten metal and oxygen flow. The sheath 122 can be formed from low carbon steel bar having an axial bore matching the outer diameter of the rod 120 and an outer diameter slightly less that that of the stainless steel tube 114.

The rod 120 is cut to a length that is less than that of the housing 116. The sheath 122 is cut to a length that is shorter than that of the rod by about ½ inch to 1½ inch. In this manner, the rod end 128 extends about ½ inch to 1½ inch beyond one end 124 of the sheath when the rod 120 is inserted into the bore of the sheath and it is flush with the sheath at the other end 126. This short end extension 128 of the rod is preferably capped with an igniter tip 130 shaped like a bullet and the area between the cap and top end of the sheath 122 may be filled with a steel wool 136 extending into the tip 130. A low temperature blasting fuse 132 may be doubled over and the bend inserted into an opening at the top of the tip such that the two ends of the fuse extend from the tip. The tip 130 is preferably beveled on one side such that the fuse ends extend out of the opening slightly off centerline. The tip 130 may also be press fit into the end of the tube 114.

To prevent the sheath 122 from sliding up and down along the rod 120 during storage or transport, which could result in dislodging the tip 130, a magnet disk 134 with a center aperture 135 may be inserted into the bottom of the housing before the lance is inserted. The disk will attract to the bottom of the housing and also attract the tube and lance to it. Alternatively, a bottom portion of the housing could be magnetized for the same purpose. The force of the pressurized oxygen is sufficient to break the magnetic attraction and propel the tube and lance upward into the obstruction in the vessel discharge port.

The relative length of the housing 116 and lance 112 is preferably chosen such that when the lance is disposed inside the housing, the tip 130 of the lance and the ends of the fuse 132 extend ¼ inch below the top open end of the housing. This location protects the tip and fuse from inadvertently dislodging or prematurely igniting when a worker is setting the lance apparatus in place below an obstructed discharge port. The tip and fuse are protected until the oxygen flow is applied and the lance lifts into the obstruction.

When the oxygen pushes the tube and lance into the vessel obstruction, the rod 120 is able to move axially within the sheath 122 under propulsion of the pressurized oxygen. This allows the rod to be burned at a rate that is independent of the burn rate of the sheath. In practice, the rod will consume at a faster rate than the sheath, and both will consume faster than the stainless steel tube. This action makes the lance apparatus more reliable, since a burn-through that starts metal flow is more likely to occur before the tube loses its form and disrupts the oxygen flow: Once metal flow is initiated, the molten material will melt the entire thermal lance apparatus and blend it into the metal discharge.

Although depicted in a dual telescoping mode, it will be apparent that the lance 112 could be used as the sole telescoping element. The magnet disk or magnetized portion of the housing would hold it motionless inside the housing until it is propelled upwardly by pressurized oxygen.

Figure 1:
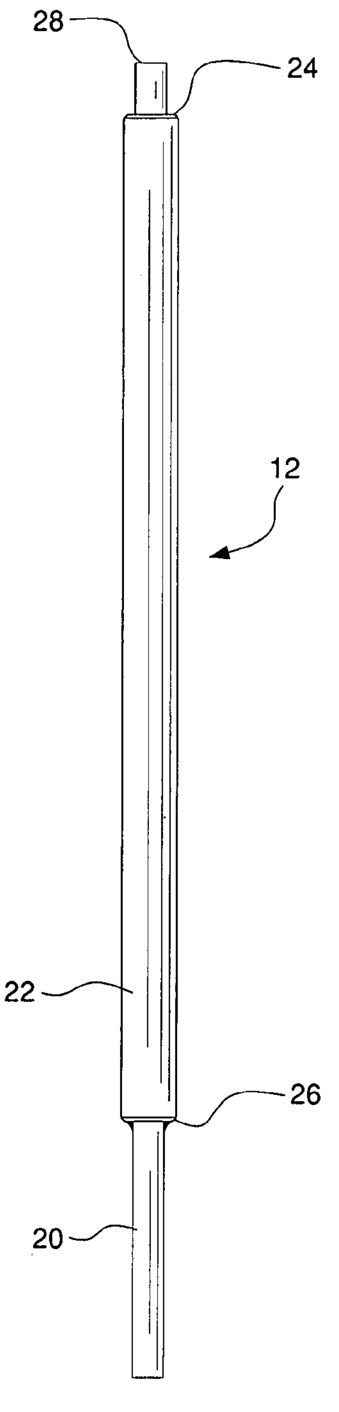
FIG. 1 (Prior Art)
FIG. 1 is a plan view of a prior art thermal lance.
Figure 2:
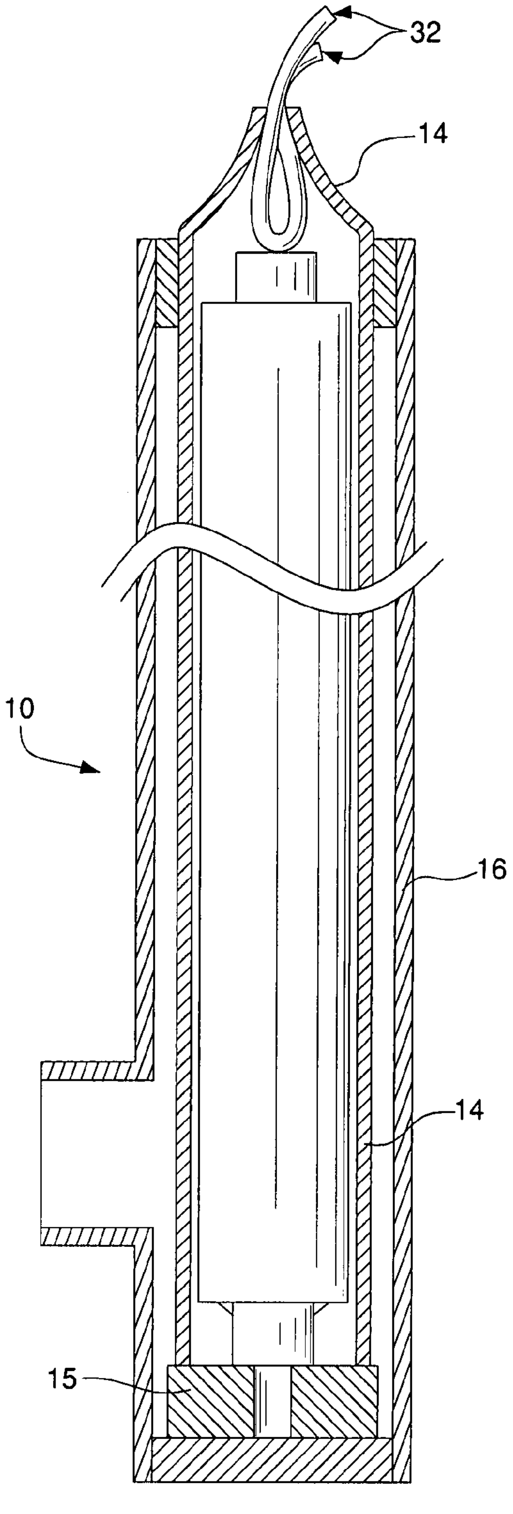
FIG. 2 (Prior Art)
FIG. 2 is a section view of a prior art thermal lance assembly
Figure 3:
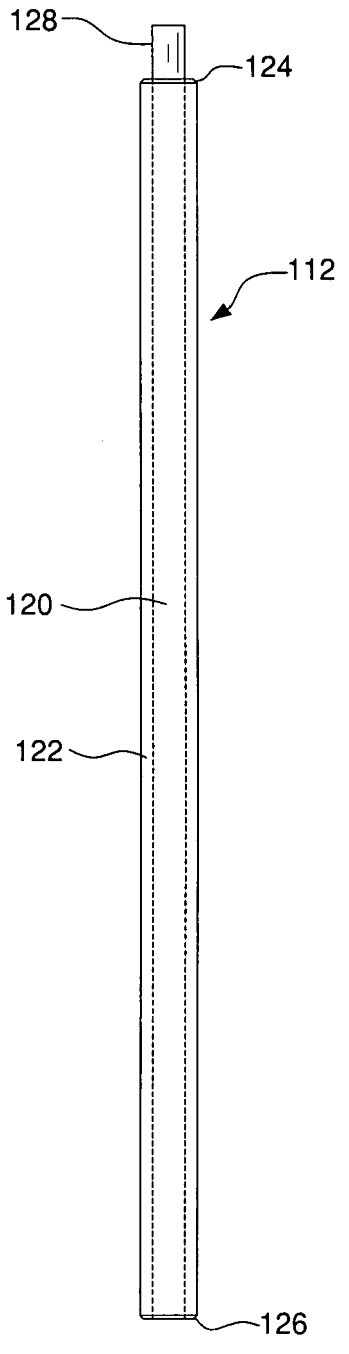
FIG. 3 is a plan view of a thermal lance according to the invention.
Figure 6:
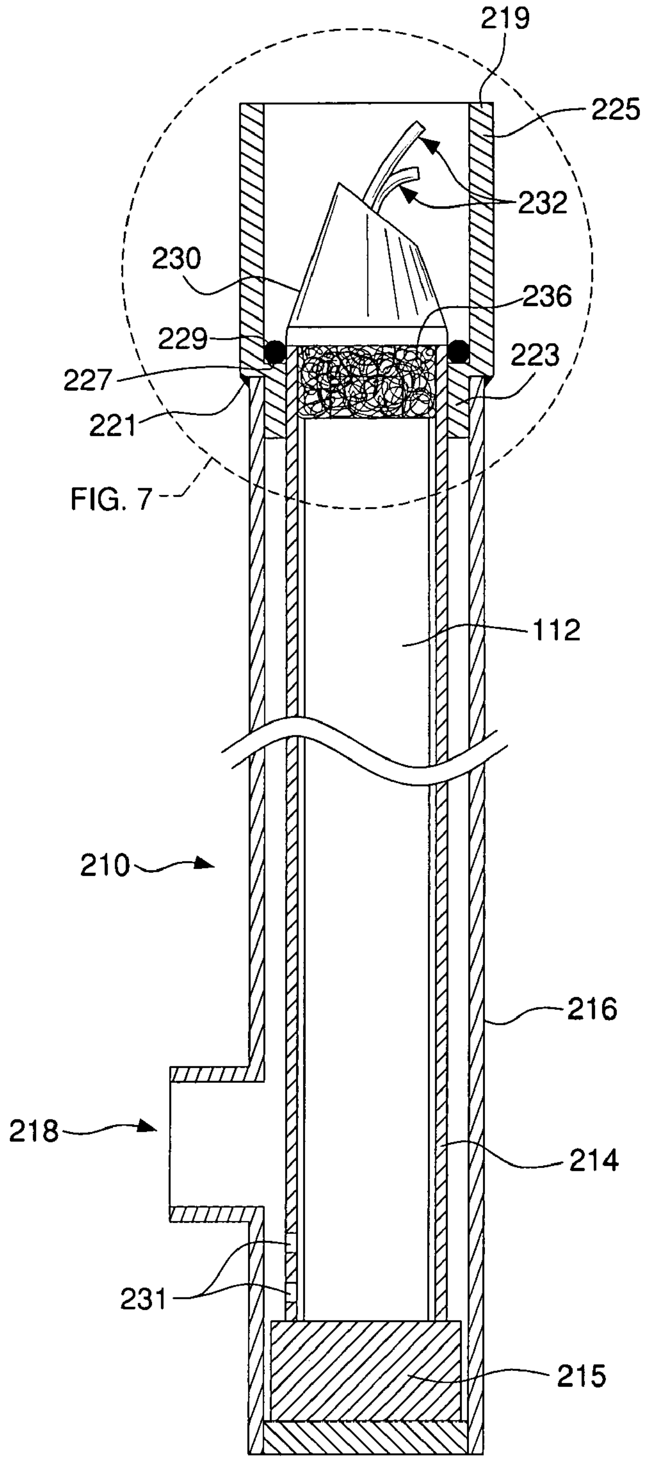
FIG. 6 is a section view of a thermal lance assembly according to a second exemplary embodiment of the invention.
Figure 7:
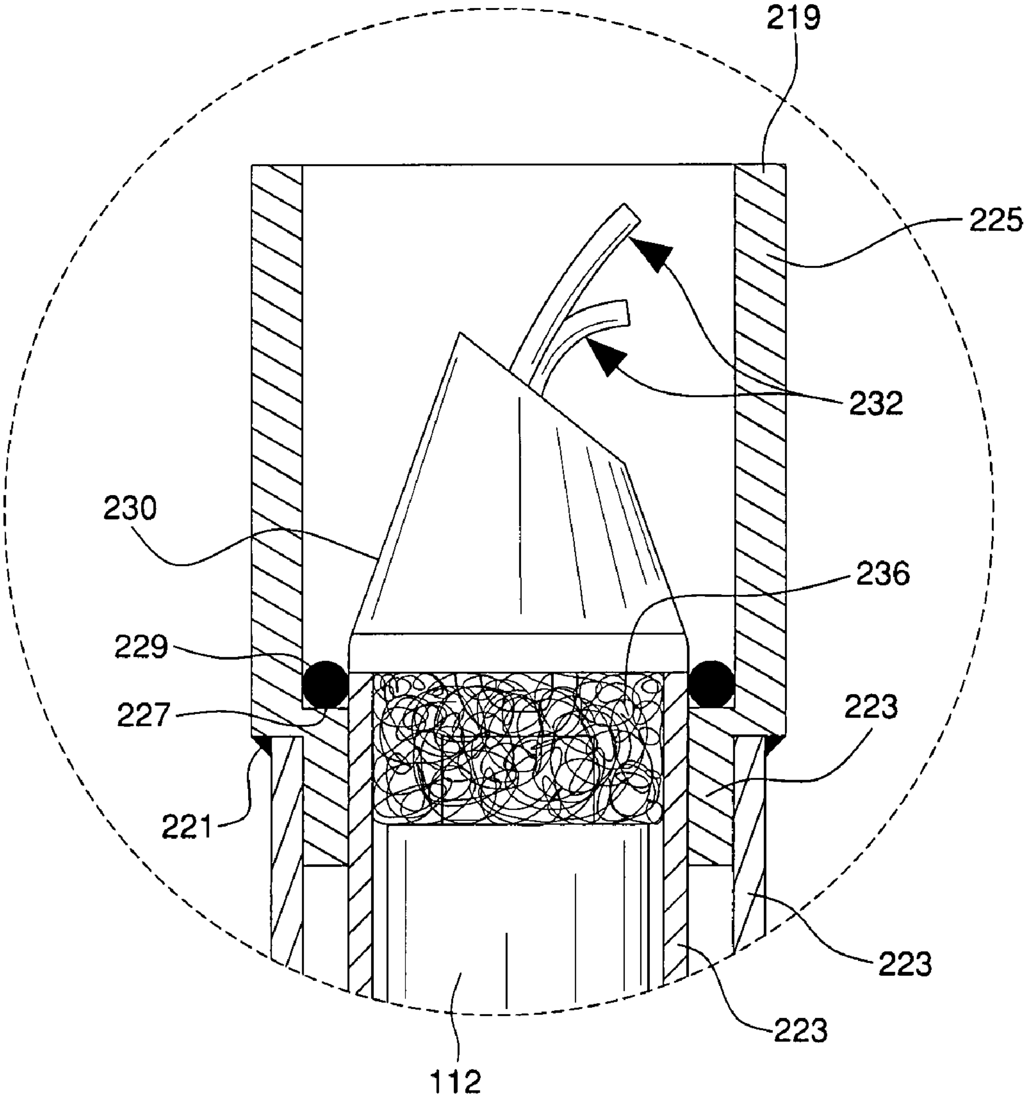
FIG. 7 is a close up section view of the top portion of the thermal lance assembly of FIG. 6.

FIGS. 6 and 7 show a lance apparatus 210 according to a second exemplary embodiment of the invention. The lance apparatus 210 includes a combustible lance 112, which can be a telescoping assembly such as in FIG. 3 or a low carbon rod inside of a stainless steel tube 214 as in FIG. 4. The stainless steel tube 214 is similar in construction to the tube 114 of the previous embodiment, except for apertures 231 as described below. The stainless steel tube 214 is located within a housing 216. Like the tube 114 of apparatus 110, the tube 214 of apparatus 210 includes a flared base or base flange 215 at a bottom end of the tube to keep the tube centered within the housing 216.

An end fitting 219 serving as a fuse protector is located at a top end of the housing 216. In the depicted embodiment, the end fitting 219 is secured to the housing 216 by welding at spots 221 about an exterior of the housing. The end fitting 219 includes a lower portion 223 disposed within an upper end portion of the housing 216. In this manner, the lower portion 223 of end fitting 219 is arranged to contact with the base flange 215 of tube 214 so as to prevent the tube 214 from completely exiting from the housing 216. The end fitting 219 includes an upper portion 225 that houses and shields a fuse tip 230 and blasting fuse 232 as shown in FIGS. 6 and 7. Steel wool 236 is used as early ignition fuel and is located within the stainless steel tube 214 above the combustible rod.

As shown in FIGS. 6 and 7, the inner dimensions of the upper portion 225 of end fitting 219 are preferably larger than those of the lower portion 223 such that a ledge or shoulder 227 is defined within an interior of the end fitting 219 by the lower portion 223. An O-ring 229 is placed within the interior of the end fitting 219 adjacent the shoulder 227. The O-ring 229 provides a retainer seal between the end fitting 219 and the tube 214 that retains the tube inside of the housing until oxygen under pressure is applied.

By using the O-ring retainer, the lance apparatus 210 does not need magnet disk at the bottom of the housing 216 to retain the tube 214 from sliding out of the housing (e.g., during storage or transport). Also, as shown, the base flange 215 has no aperture to allow oxygen to enter into the bottom of the tube 214 from the conduit 218 into housing 216. Instead, the tube 214 includes apertures 231, preferably two or more, in the wall of the tube to allow passage of oxygen under pressure into the interior of the tube 214.

Locating relatively small apertures in the wall of tube 214 along the lower side of the tube serves to restrict the amount of oxygen that can flow into the interior of tube 214 during initial burning of the combustible lance. As shown in FIG. 6, the lower sides of the combustible lance 112 located within the tube 214 are located adjacent to the apertures 231 prior to ignition and supply of oxygen. After the fuse is lit and oxygen pressure applied, the apertures restrict the amount of oxygen initially passing into the interior of the tube 214. As should be understood, the ignition and consumption of the combustible lance 112 will move the lance upward and eventually cause the base 215 to rise above the apertures, which will then allow full rate of oxygen flow into the tube. This arrangement prevents a rapid flow of oxygen until the lance is fully ignited.

I claim:

1. A thermal lance apparatus for unplugging a discharge port of a vessel containing molten metal, said apparatus comprising:
- an tubular housing having a top end, bottom end and a hollow interior chamber;
- a conduit in the housing communicating with the interior chamber for introducing pressurized oxygen into the housing;
- an axially-displaceable combustible thermal lance disposed within the interior chamber of the housing such that an upward end of the lance extends toward the top end of the housing;
- an ignitable fuse mounted on the upward end of the lance;
- an end fitting secured to the top end of the housing, the end fitting having an upper portion extending outside of the housing and a lower portion received within the hollow interior chamber, such that the transition between upper and lower portions defines a ledge within the end fitting; and
- an O-ring located on the ledge of the end fitting and disposed between the end fitting and the thermal lance to retain the lance within the housing.

2. A thermal lance apparatus as in claim 1, wherein the end fitting extends above the fuse to protect the fuse.

3. A thermal lance apparatus as in claim 2, wherein the combustible lance includes:
- a tube having an internal bore and a base flange;
- a cylindrical rod disposed in the bore of the tube and allowed to move axially within the tube under propulsion of the pressurized oxygen; and
- an aperture in a aide wall of the tube at a location below the housing conduit and above the base flange.

* * * * *